United States Patent [19]

Kanahara et al.

[11] Patent Number: 5,082,163
[45] Date of Patent: Jan. 21, 1992

[54] METHOD OF METALLIZING NON-OXIDE CERAMICS

[75] Inventors: Naoyuki Kanahara, Akigawa; Tetsuo Furihata, Higashiyamato, both of Japan

[73] Assignee: Dowa Mining Co., Ltd., Tokyo, Japan

[21] Appl. No.: 451,299

[22] Filed: Dec. 15, 1989

[30] Foreign Application Priority Data

Mar. 1, 1989 [JP] Japan ................................. 64-46597

[51] Int. Cl.$^5$ ............................................. B23K 31/02
[52] U.S. Cl. ..................................... 228/124; 228/198; 228/238
[58] Field of Search ............... 228/122, 123, 124, 198, 228/219, 221, 238, 263.12; 427/229, 294

[56] References Cited

U.S. PATENT DOCUMENTS 4,811,893  3/1989  Kanahara et al. .................. 228/198
4,954,386  9/1990  Mizunoya et al. .................. 228/124

Primary Examiner—Samuel M. Heinrich
Attorney, Agent, or Firm—Frishauf, Holtz, Goodman & Woodward

[57] ABSTRACT

A non-oxide ceramic material such as aluminum nitride can be metallized with copper by directly bonding a thin sheet of copper to a substrate of the non-oxide ceramic material instead of using a conventional manner in which a paste comprising a powder of copper and a binder is applied to a ceramic substrate by printing. This metallization is effected by placing the non-oxide ceramic material either in contact with or in close proximity to copper containing a copper oxide, followed by heating them in a non-oxidizing atmosphere at a temperature lower than the melting point of copper, but at which the dissociation of the copper oxide contained in copper can occur, so as to dissociate at least part of the copper oxide into metallic copper and oxygen to thereby provide a strong bondage between the surfaces of said non-oxide ceramic material and copper. The metallized non-oxide ceramic material can be used as a substrate for use in IC devices.

12 Claims, No Drawings

METHOD OF METALLIZING NON-OXIDE CERAMICS

BACKGROUND OF THE INVENTION

The present invention relates to a method of metallizing the surface of non-oxide ceramics. In particular, the present invention relates to a method of metallizing non-oxide ceramics at low cost, thereby enabling large-scale production of the same on a commercial basis.

The "high-melting point metal" method, a common technique for metallizing oxide ceramics such as alumina, has also been applied to non-oxide ceramics and metallized AlN substrates fabricated by such applied technique known as "tungsten metallizing method" have been developed and sold on the market.

A method is also known in which a Ag paste, Ag-Pd paste or Cu paste is printed or otherwise coated on a ceramic alumina substrate and its surface is metallized by firing either in an oxidizing atmosphere (in the case of Ag or Ag-Pd paste) or in a non-oxidizing atmosphere (in the case of Cu paste). As a modification of this process, pastes applicable to non-oxide AlN ceramics have been developed and gained increasing acceptance in the industry.

A more recently developed method for metallizing ceramics comprises roughening a surface of ceramics, activating the roughened surface with palladium, and depositing a metal plate by electroless plating. A method has also been developed in which an active metal is coated on the surface of a ceramic material and heated in an inert atmosphere so that the ceramic material reacts with the active metal to have its surface metallized.

In the case where the metallized product is to be used as a high-frequency circuit substrate, metallization is effected by vacuum-evaporating a metal on the surface of the ceramic material. This method has proved to be effective for both types of ceramics, oxides or non-oxides.

As it turned out, however, the prior art methods have suffered the following problems when they are applied to metallization of non-oxide ceramics. In such methods as the tungsten metallizing method which perform metallization using high-melting point metals, a paste of high-melting point metal is coated onto a green sheet, which then must be fired at a temperature as high as 1,200°-1,800° C. either in vacuum or in an inert atmosphere and this increases both the initial and running costs. Further, the firing of the green sheet is disadvantageous in that the dimensional precision of the metallized surface after firing deteriorates appreciably on account of the thermal shrinkage which accompanies the firing. In addition, tungsten and molybdenum commonly employed as high-melting point metals are expensive and their electric conductivity after firing is low compared to other metal elements.

The use of Ag and Ag-Pd pastes also involves problems; first, the strength of their adhesion to non-oxide ceramics is not as high as the value exhibited by conventional 96% class alumina substrates, and second, migration occurs. Further, the oxidizing atmosphere which is necessary for firing Ag and Ag-Pd pastes causes either oxidation of the non-oxide ceramic material per se or occasional failure to accomplish thorough firing on account of the creation of a reducing atmosphere in the paste-coated area during firing because the non-oxide ceramic material is burnt and decomposed during firing.

As a further problem, the pastes have incorporated therein an oxide or other ceramics that are commonly referred to as "glass frit" in order to provide improved adhesion to the non-oxide ceramic material to be metallized and such "glass frit" prevents silver from exhibiting its inherent electric conductivity.

In contrast to Ag and Ag-Pd pastes, the Cu paste which is fired in a non-oxidizing atmosphere is free from the problems associated with the combustion and decomposition of the non-oxide ceramic material. However, the Cu paste also contains a glass frit and after firing, it displays an extremely low electric conductivity as compared to pure copper. Further, the strength of adhesion of the Cu paste is generally lower than that of Ag and Ag-Pd pastes.

The method of metallization that employs electroless plating comprises the steps of roughening the surface of a ceramic material, activating the surface with Pd and applying a plate by electroless plating. In this method, the adhesion of metal plate is weak since it is achieved only by the anchor effect provided in the roughening step. Further, the roughened surface must be activated with a Pd salt and the use of expensive Pd is costly and unsuitable for large-scale production. As another problem Pd which is left between the ceramic substrate and the metal plate must be removed before an electric circuit is formed by etching.

The "active metal method" has the disadvantage of heating the active metal until it melts so that it can react with the surface of the ceramic material. Active metals generally have high melting points and are active, so that they must be heated either in vacuum or in an inert atmosphere. This necessitates the use of large facilities and the operation must be done at high running cost. Further, the metallic surface provided by metallization with active metals are generally low in electric conductivity and wet poorly with solder, so the metallized surface must be later plated.

Attempts have been made to lower the melting points of active metals by alloying them with metals such as Ag, Cu and Ni but the use of active metals still presents the aforementioned problems associated with the heating atmosphere. If vacuum is to be used, it takes such a long time to evacuate the system that the operational efficiency is not so high as to warrant continuous production. Inert gases such as argon are too expensive to be discharged into air atmosphere.

Metallization of non-oxide ceramics by vacuum evaporation suffers the problem of limited applicability since the evaporated metal layer has low adhesion strength. This method is also unsuitable for large-scale production because of several reasons including the low production rate accompanying evacuation of the system and the loss of starting materials due to evaporation. In addition, prolonged evaporation is necessary to provide a reasonable thickness of metal layer and this further reduces the production rate of the overall operation.

SUMMARY OF THE INVENTION

Under the circumstances described above, the present inventors analyzed the problems involved in the prior art methods of ceramics metallization and undertook investigations in order to develop a novel method by which non-oxide ceramics could be metallized without experiencing these problems. As a result, the present inventors found that when a non-oxide ceramic material placed either in contact with or in close proximity to copper was heated at a predetermined temperature lower than the melting point of copper so as to dissociate at least part of the copper oxide in the copper, the surface of the non-oxide ceramic material could successfully be metallized with copper. The metallized copper layer adhered strongly to the ceramic substrate and tests showed that this method was industrially applicable. The present invention has been accomplished on the basis of these findings.

Thus, the present invention provides a method of metallizing a non-oxide ceramic material in which the non-oxide ceramic material placed either in contact with or in close proximity to copper containing a copper oxide is heated in a non-oxidizing atmosphere at a predetermined temperature lower than the melting point of copper, so as to dissociate at least part of the copper oxide in the copper, thereby metallizing the surface of said non-oxide ceramic material with copper.

DETAILED DESCRIPTION OF THE INVENTION

It is well known that industrially produced tough pitch copper contains 200–400 ppm of oxygen. The oxygen in tough pitch copper has no easy access as interstitial atoms into the crystal structure of copper atoms and only when a sufficient time is given for diffusion will the oxygen be present either as cuprous oxide ($Cu_2O$) at the grain boundaries or as a tabular $Cu_2O$ structure in the grains. Therefore, if the tough pitch copper is heated in a non-oxidizing atmosphere, one may well say that it has two-phase structure composed of Cu and $Cu_2O$.

As is well known, the following equation of dissociation equilibrium is established between Cu and $Cu_2O$:

$$Cu_2O(s) = 2Cu(s) + \tfrac{1}{2}O_2(g).$$

Since the following relationships hold good for the change in standard free energy that accompanies this dissociative reaction, $$\Delta G^\circ = 40,500 + 3.92T \log T - 29.5T \text{ [cal]}$$

$$\Delta G^\circ = -RT\ln \frac{P_{O_2}^{\frac{1}{2}} \cdot A^2 Cu}{A_{Cu_2O}}$$

one may understand that $Cu_2O$ will dissociate at temperature Td which depends on the oxygen partial pressure. For example, if the oxygen partial pressure ($P_{O_2}$) is $2.763 \times 10^{-9}$ atm, the minimum temperature for dissociation of $Cu_2O$ is 1,085K or 812° C. (see Otani et al., "Yakinbutsurikagaku Enshu—kiso to oyo (A seminar on Physical Chemistry of Metallurgy—Its Fundamentals and Applications)", Maruzen, p. 122).

The present inventors thought that the dissociative reaction described above would take place if oxygen-containing copper, for example, tough pitch copper could be placed in an atmosphere having a predetermined oxygen partial pressure. Based on this assumption, the present inventors conducted their studies and found that such an environment could be created by heating a non-oxide ceramic material either in contact with or in close proximity to tough pitch copper and also that the ceramic material could thus be successfully metallized with copper.

When heated in the environment described above, $Cu_2O$ in the tough pitch copper would dissociate and decompose into copper and oxygen at the small gap between the tough pitch copper and the non-oxide ceramic material, with subsequent metallization of the surface of the ceramic material with a strongly adherent copper layer. The continued progress of this reaction can be insured by maintaining the equilibrium between the formation of an oxiding atmosphere on the surface of the non-oxide ceramic material due to the decomposition of $Cu_2O$ and the subsequent decomposition of the surface of said ceramic material by the oxidizing atmosphere.

As the surface of the non-oxide ceramic material is metallized with copper, its superficial decomposition is gradually suppressed, with subsequent decrease in the rate of $Cu_2O$ dissociation and hence its decomposition. Consequently, the dissociative reaction is terminated when the surface of the non-oxide ceramic material has been metallized with a certain critical amount of copper.

As already mentioned, the temperature at which $Cu_2O$ in the tough pitch copper dissociates can be estimated by calculating the standard free energy for the reaction of $Cu_2O$ dissociation and the temperature at which this reaction starts will vary with the oxygen partial pressure. Therefore, the heating temperature and oxygen partial pressure are predominantly important factors to be considered in the practice of the method of the present invention. The condition of oxygen partial pressure need be satisfied with respect to the oxygen partial pressure in the neighborhood of the surface of tough pitch copper. The oxygen partial pressure increases with the progress of $Cu_2O$ dissociation or decomposition, but even in this case, the method of the present invention can be successfully implemented if the oxygen partial pressure at which the dissociation of $Cu_2O$ proceeds is established in the neighborhood of the surface of the non-oxide ceramic material. It is therefore concluded that the atmosphere in which the non-oxide ceramic material to be metallized is placed may be such that the oxygen partial pressure developing in the neighborhood of its surface allows $Cu_2O$ to undergo sustained reaction of dissociation and decomposition.

While the method of the present invention is applicable to a wide range of non-oxide ceramics, aluminum nitride (AlN) has been the subject of active research in the industry, so this is taken as an example in the following description of decomposition reaction that is to occur on the surface of a ceramic material. As for the reaction that occurs on the surface of AlN, it was reported in "An Abstract of the Proceedings of the 1988 Autumn Meeting of the New Materials Society of Japan", D-4, pp. 13–16 that when the surface of AlN was contacted by a molten glass phase, AlN decomposed with subsequent diffusion of Al into the molten glass. According to this report, the glass phase contains $SiO_2$ and $B_2O_3$, and ions in the molten glass, in particular, oxygen ion caused melting of AlN.

The present inventors have also pointed out that AlN decomposes in the method developed by them but unlike glass, the material that contacts AlN in the method does not melt and as will be described later in the examples of the present invention, copper adheres tightly to the surface of AlN even if it is heated at 1,000° C. and a liquid phase does not form at this temperature from either copper or the Cu-$Cu_2O$ eutectic. It is therefore clear that AlN does not decompose in the method of the present invention on account of its contact with molten glass. The report also pointed out that AlN decomposed at a certain value of oxygen partial pressure and it has been confirmed that this is also true with the method of the present invention.

One of the important objects of the present invention is to provide a method of metallizing the surface of non-oxide ceramics substrate to be used in electronics industry, etc., with a thin sheet of copper by directly bonding said thin sheet of copper to the non-oxide ceramics substrate, instead of using a copper-containing paste as in the conventional metallizing method. Thus, the thin sheet of copper having a thickness in the range of 18-3,000 μm is generally used, with the sheet 200-500 μm thick being the most preferred.

Typical non-oxide ceramic materials which can be employed in the practice of the present invention include aluminum nitride (AlN), trisilicon tetranitride ($Si_3N_4$), and silicon carbide (SiC), with aluminum nitride being the most preferred.

Copper material which can be used in the practice of the present invention should contain at least 100 ppm of oxygen in the form of copper oxide (mainly $Cu_2O$), preferaly 200-500 ppm of oxygen in the form of $Cu_2O$. Commercially available tough pitch copper generally contains 200-400 ppm of oxygen in the form of $Cu_2O$. Thus, tough pitch copper is conveniently used in the practice of the present invention.

The metallizing reaction should be carried out in a non-oxidizing atmosphere such as in vacuum, in nitrogen or in argon. The atmosphere is required to contain such a small amount of oxygen that the oxygen partial pressure in the same atmosphere is in the range of 0.01-10,000 ppm, preferably in the range of 10-500 ppm. The reason is as follows. It is disadvantageous from an industrial viewpoint to realize the oxygen partial pressure of less than 0.01 ppm, because such high degree of vacuum is not easy to attain when vacuum is to be used, or alternatively such high purity gas is costly when an inert gas is to be used, and in addition the rate of reaction is too high to be controlled. On the other hand, when the oxygen partial pressure exceeds 10,000 ppm, the reaction does not proceed. The metalling reaction should be carried out at a temperature lower than the melting point of copper, but at which the dissociation of $Cu_2O$ contained in copper can proceed. In particular, the temperature in the range of 1,000°-1,070° C. can be employed advantageously.

The assembly of non-oxide ceramics and copper containing copper oxide should be kept at such an enhanced temperature for at least 0.5 minutes, preferably for a period of time in the range of 5-20 minutes. The resulting metallized ceramics substrates are useful for use in electronics industry.

The present invention is hereunder described in greater detail with reference to example and comparative example.

EXAMPLE 1

An aluminum nitride (AlN) substrate 620-650 μm thick, non-oxide ceramic substrate produced by Tokuyama Soda Co., Ltd.) and a commercial grade of tough pitch copper (280 ppm of $O_2$) were provided. Each of the ceramic substrate and the tough pitch copper was cut into square (50 mm×50 mm) pieces, which were passed through a conveyor furnace, with the AlN substrate being superposed on the tough pitch copper. The oxygen partial pressure in the furnace was so adjusted as to maintain an oxygen concentration of 20 ppm. Oxygen partial pressure detection was made by means of an oxygen sensor using zirconia asda solid ion-conductive electrolyte.

The atmosphere in the furnace was held at various maximum temperatures for 10 minutes. The results of observations of the deposition of copper on the surface of the AlN substrate are shown in the following Table 1 for each of the maximum temperature employed.

TABLE 1

| Maximum temperature in the furnace (°C.) | Surface state of AlN substrate |
|---|---|
| 1,000 | metallized with Cu |
| 1,050 | metallized with Cu |
| 1,060 | metallized with Cu |
| 1,070 | metallized with Cu |
| 1,090 | Cu melted and failed to metallize the substrate surface |

In order to determine whether the deposit in the metallized area of the substrate was made of $Cu_2O$ or Cu, the area was analyzed by X-ray diffraction. The peaks observed were only those for AlN and Cu, indicating that the substance deposited on the AlN substrate was copper. Observation of the deposited copper under a scanning electron microscope revealed the presence of many gaps between the Cu particles and it was found to have no electric conductivity in a conduction test.

The strength of adhesion of the Cu layer formed on the AlN substrate in the furnace adjusted to have an internal temperature of 1,000° C. was measured by the following method. A copper plate was applied to the copper deposited area to provide a Cu thickness suitable for a tensile test. A square (2 mm×2 mm) pad for tensile test was fabricated by conventional etching procedures and a copper wire (0.8 mmφ) was attached to the pad by soldering.

The pad was then set on a tensile tester and the copper wire was pulled at an angle of 90° with respect to the surface of the pad. The measured values of tensile strength are shown in Table 2 below, which also shows the result with a comparative sample which was a Ag-Pd paste coated and fired on an alumina substrate.

TABLE 2

| | Adhesion strength (2 mm square) |
|---|---|
| Method of the present invention (on AlN) | 7 kg, 6.8 kg, 7.2 kg |
| Ag—Pd paste (on $Al_2O_3$) | 4.5 kg, 4.0 kg, 4.7 kg |

The strength of adhesion between copper and AlN that was attained by the metallizing method of the present invention was higher than that exhibited by the Ag-Pd paste fired alumina substrates (thick film IC substrates) which are currently used in large volumes in the industry. Therefore, the non-oxide ceramics metallized with copper by the method of the present invention are anticipated to insure satisfactory strength of adhesion in practical applications.

EXAMPLE 2

The procedure of Example 1 was repeated except that the oxygen partial pressure in the furnace was varied at three different levels. The results of observation of the surface state of AlN substrate are shown in Table 3 below for each of the maximum temperatures created in the furnace.

TABLE 3

| Maximum temperature in furnace (°C.) | Oxygen partial pressure in furnace | | |
|---|---|---|---|
| | 20 ppm | 100 ppm | 400 ppm |
| 1,000 | metallized with Cu | metallized with Cu | metallized with Cu |
| 1,050 | metallized with Cu | metallized with Cu | metallized with Cu |
| 1,060 | metallized with Cu | metallized with Cu | metallized with Cu |
| 1,070 | metallized with Cu | metallized with Cu | metallized with Cu |
| 1,080 | Cu melted | Cu melted | Cu melted |

When copper melted, the surface of the AlN substrate could not be metallized with copper.

EXAMPLE 3

The procedure of Example 2 was repeated except that the AlN substrate was replaced first by a $Si_3N_4$ substrate and then by a SiC substrate. Whichever substrate was used, its surface was effectively metallized with copper in the temperature range of 1,000°–1,070° C. as in the case of the AlN substrate.

EXAMPLE 4

Tough pitch copper was melted in a crucible furnace, cast into an ingot and rolled to produce samples of tough pitch copper (300 μm thick) having different oxygen contents. A metallizing experiment was conducted on these samples as in Example 1 and the results of observation of copper deposition on the AlN substrate are shown in Table 4.

TABLE 4

| Maximum temperature in furnace (°C.) | Concentration of oxygen in tough pitch copper (ppm) | | | |
|---|---|---|---|---|
| | 140 | 192 | 920 | 1,060 |
| 1,050 | metallized with Cu | metallized with Cu | metallized with Cu | metallized with Cu |
| 1,060 | metallized with Cu | metallized with Cu | metallized with Cu | metallized with Cu |
| 1,070 | metallized with Cu | metallized with Cu | Cu melted | Cu melted |

As Table 4 shows, the AlN substrate of the tough pitch samples having oxygen concentrations of 920 ppm and 1,060 ppm could not be metallized with Cu at 1,070° C. probably because copper formed a eutectic melt with $Cu_2O$ and melted away in the ceramic substrate.

As a comparison, oxygen-free copper was used instead of tough pitch copper but the AlN substrate could not be effectively metallized with copper.

COMPARATIVE EXAMPLE

A metallizing experiment was conducted as in Example 1 using $Al_2O_3$ and $ZrO_2$, respectively, as oxide ceramic materials. When the temperature in the furanace was 1,000° C. and 1,050° C., neither substrate could successfully be metallized with copper. At furnace temperatures of 1,060° C. and 1,070° C., tough pitch copper could be effectively bonded to each substrate as in the case where the method described in the specification of Japanese Patent Application No. 61-316143 (entitled "Process for Producting Bonded Copper-Alumina Substrate") was employed. At 1,080° C., however, the tough pitch copper formed a eutectic liquid phase and melted away.

As shown above, the substrates made of oxide ceramics could not be effectively metallized with copper and this would be explained as follows: because of the absence of the decomposition of ceramics on their surface, the dissociation of $Cu_2O$ in tough pitch copper and the decomposition of ceramics do not take place in the same system and this makes it impossible for the surface of the ceramics to be metallized with copper.

As described on the foregoing pages, the metallizing method of the present invention offers the advantage that the metal bonded to the surface of non-oxide ceramics has high strength of adhesion and good heat resistance. In addition, the surface of non-oxide ceramics can be effectively metallized without employing any special paste or production equipment. Thus, the method of the present invention can be implemented at a lower cost than conventional processes and is adapted for large-scale production of metallized non-oxide ceramics.

What is claimed is:

1. A method of metallizing a non-oxide ceramic material comprising heating the non-oxide ceramic material placed either in contact with or in close proximity to tough-pitch copper containing 200–400 ppm of oxygen in the form of $Cu_2O$ in vacuum, in nitrogen or in argon, each containing a small amount of oxygen whose oxygen partial pressure is in the range of 10–500 ppm at a temperature of 1,000° C. or higher but lower than the eutectic point of Cu and $Cu_2O$, so as to dissociate at least part of the copper oxide in the copper, thereby metallizing the surface of said non-oxide ceramic material with copper.

2. A method of metallizing a non-oxide ceramic material with a thin sheet of copper which comprises the steps of: placing the non-oxide ceramic substrate either in contact with or in close proximity to a thin sheet of tough-pitch copper which contains 200–400 ppm of oxygen in the form of $Cu_2O$; heating the assembly of said non-oxide ceramic substrate and the thin sheet of copper in vacuum, in nitrogen or in argon, each containing a small amount of oxygen whose oxygen partial pressure is in the range of 10–500 ppm to a temperature of 1,000° C. or higher but lower than the eutectic point of Cu and $Cu_2O$ so as not to cause the formation of the eutectic liquid phase of Cu-$Cu_2O$, but at which the copper oxide contained in said copper can dissociate; and thereby dissociating at least part of the copper oxide contained in said copper to provide a strong bondage between the surfaces of said ceramic substrate and said thin sheet of copper.

3. The method of claim 1 or 2 wherein said non-oxide ceramic material is aluminum nitride, trisilicon tetranitride or silicon carbide.

4. The method of claim 2 wherein said non-oxide ceramic material is an aluminum nitride substrate for use in the electronics industry, said thin sheet of copper is a sheet of tough pitch copper having a thickness in the range of 18–3,000 μm, said heating is in a vacuum or nitrogen atmosphere having a partial oxygen pressure of 10–500 ppm, said temperature in said atmosphere is in the range of from 1,000° C. to lower than the eutectic point of Cu and $Cu_2O$, and the period for such heating is in the range of 0.5–20 minutes.

5. The method of claim 4 wherein said heating is in said vacuum atmosphere.

6. The method of claim 4 wherein said heating is in said nitrogen atmosphere.

7. The method of claim 5 wherein said temperature is in the range of 1,050° C.–1,060° C.

8. The method of claim 6 wherein said temperature is in the range of 1,050° C.–1,060° C.

9. The method of claim 7 wherein said temperature is in the range of 1,050° C.–1,060° C.

10. The method of claim 3 wherein said non-oxide ceramic material is aluminum nitride.

11. The method of claim 3 wherein said non-oxide ceramic material is trisilicon tetranitride.

12. The method of claim 1 or 2 wherein said non-oxide ceramic material is silicon carbide.

* * * * *